United States Patent Office 3,460,152
Patented Aug. 5, 1969

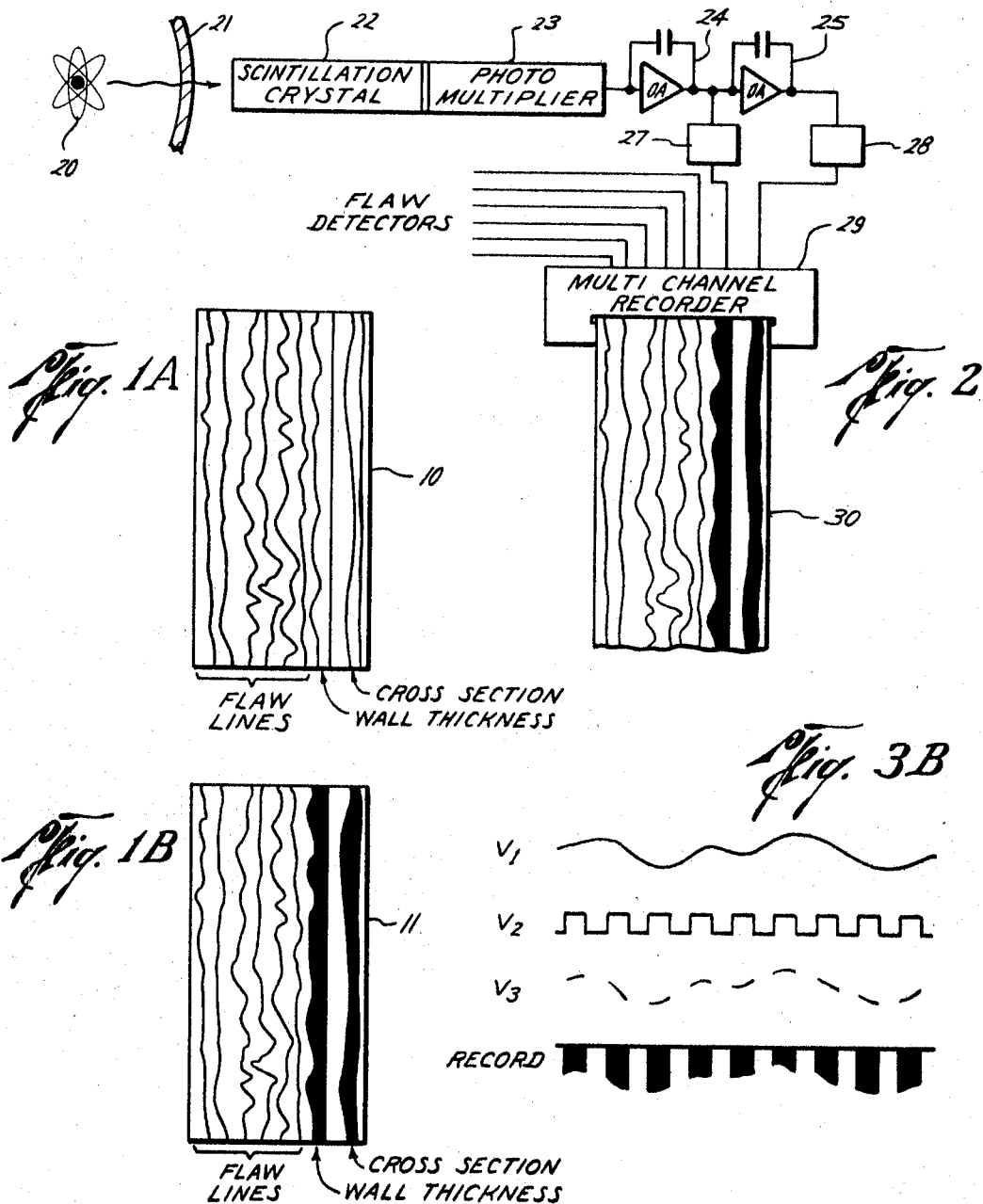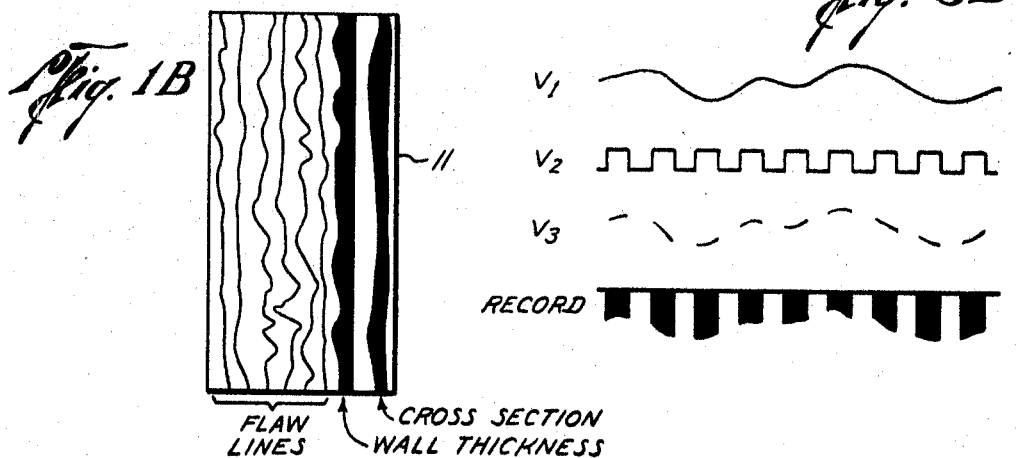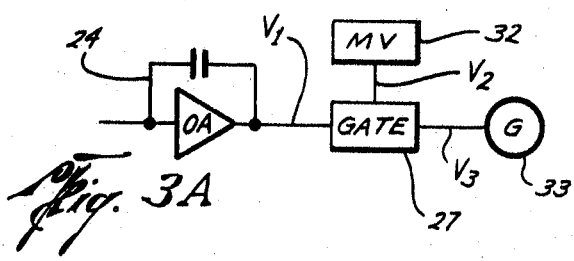

3,460,152
APPARATUS FOR RECORDING DATA
Noel B. Proctor, Sugarland, and Fenton M. Wood, Houston, Tex., assignors to American Machine & Foundry Company, New York, N.Y., a corporation of New Jersey
Filed July 13, 1967, Ser. No. 653,058
Int. Cl. G01d 9/00
U.S. Cl. 346—33          7 Claims

ABSTRACT OF THE DISCLOSURE

Means for recording signals representing wall thickness and cross-sectional area of a tubular product. The recorder paints a record which is easily read by an observer with limited experience in log reading. The analog signal produced by wall thickness detecting apparatus is passed through integrating means to establish the signal for cross-sectional area. The continuous wall thickness and cross-sectional area signals are passed through gating means, and the pulsed output of the gating means is recorded against a reference tolerance line.

Background of the invention

This invention relates to non-destructive testing of tubular products and in particular to apparatus and methods of establishing and displaying signals representing the wall thickness and cross-sectional area of tubular products.

It is conventional practice to employ non-destructive testing techniques in checking tubular products such as pipe used in the petroleum industry for material defects. Surface cracks, pits and the like can be detected by magnetic detecting apparatus such as disclosed in U.S. Patent No. 2,650,344; 2,881,387; and 2,878,447. Radiation techniques as disclosed in U.S. Patent No. 3,023,312, and ultrasonic techniques as disclosed in U.S. Patent No. 3,226,976 are usually employed to measure wall thickness and variations therein.

While testing equipment can be connected to various alarm means, usually it is most practical to employ multichannel recorders to record the electrical signals produced by the detecting apparatus. Such a record will include a number of flaw traces from magnetic detectors and a trace for the wall thickness along with a reference or base line representing a minimum tolerable thickness. However, because of the number of traces on record, it is often difficult for an inexperienced observer to distinguish the wall thickness from the flaw traces.

Summary of the invention

In accordance with this invention, recorded wall thickness and cross-sectional area data can be easily and reliably interpreted. Briefly, an analog signal representing the detected wall thickness is established by inspection equipment. The signal is passed through a gating circuit which chops the signal and produces pulses having amplitudes equal or proportional to the amplitude of the analog signal. The pulsed signal is then recorded by a mechanical or optical recorder. As the pulsed signal is received by the recorder, the stylus or light beam of the recorder moves to and from a base line representing a tolerance reference. In effect, the pulsed wall thickness signal is "painted" on the record, i.e., the area between the base line and the wall thickness line is darkened by the movement of the recorder stylus or light beam. Further, the invention includes establishing a record of the cross-sectional area of the product under examination by passing the analog wall thickness signal through an integrating circuit. The cross-sectional area signal is recorded against a base or reference line as above described, or the signal is used as the reference line against which the wall thickness signal is recorded.

The invention will be more fully understood from the following detailed described and appended claims when taken with the drawings.

Brief description of the drawings

FIGURE 1a is a record portion with traces as conventionally recorded,

FIGURE 1b is a record portion with traces as recorded in accordance with this invention.

FIGURE 2 is a block diagram of apparatus in accordance with the invention for obtaining and recording wall thickness and cross-sectional area data, FIGURE 3a is a block diagram of a gate portion of FIGURE 2, and FIGURE 3b is curves for voltages in the gate portion shown in FIGURE 3a and the record produced thereby.

Description of the preferred embodiment

Referring now to FIGURE 1a, a portion 10 of a conventionally recorded log is illustrated. The record includes cross section and wall thickness curves and a plurality of flaw lines from magnetic flaw detectors. While only six flaw lines are shown, an actual record may have many more. Such a record is difficult to read, and defects can escape the eye of one having only limited experience in reading logs.

FIGURE 1b is a log portion 11 made in accordance with this invention in which the wall thickness and cross-sectional area records are easily visualized and read. The areas on the record bounded by the base lines and the wall thickness and cross-sectional area traces are darkened by the recorder stylus or light beam, thus presenting to the eye an apparent solid or "painted" trace of the wall thickness or cross-sectional area. These traces are much easier to study, and the wall thickness falling below a minimum tolerance is easily detected.

FIGURE 2 is a block diagram of apparatus for developing the recorded wall thickness and cross-sectional area signals. The apparatus includes a radioactive gamma ray source 20 mounted inside the wall 21 of the tubular product under examination, and diametrically opposite a scintillation crystal 22 and a photo-multiplier tube 23 positioned outside of the product. The scanning apparatus consisting of radio active source, crystal and tube may be stationary while the product under examination is rotated and axially translated, or the scanning apparatus may be mounted on a carrier which is rotatable with respect to the product. The latter arrangement is shown in U.S. Patent No. 3,023,312. The output of the photo multiplier varies in amplitude with the number and intensity of rays striking the crystal which in turn varies with the thickness of the wall of the product. The analog signal produced by the photo multiplier is supplied to a high-speed integrating operational amplifier 24 having a time constant in range of $10^{-2}$–$10^{-5}$ second. The output of amplifier 24, which represents an average wall thickness for a small increment of scanned surface, is then supplied to a second, slow-speed integrating operational amplifier 25. Amplifier 25 has a time constant of the order of one second, depending on the rotational speed of the pipe or the scanning apparatus. The slow-speed operational amplifier integrates the varying wall thickness signal from the high-speed amplifier, and thus produces a signal which is a function of the cross-sectional area scanned during the period of integration.

The outputs of operational amplifier 24 and operational amplifier 25 are connected through gates 27 and 28, respectively, to recorder 29. The gates chop the signals from the amplifiers and the resulting pulsed signals are recorded. FIGURES 3a and 3b better illustrate the operation of the gates. In FIGURE 3a, the input to gate 27 is connected to the output of operational amplifier 24, and the output of the gate is connected to the recording galvanometer 33. A free running multivibrator 32 provides gating pulses for the gate. FIGURE 3b shows the waveform for the voltage $V_1$ at the input to the gate, voltage $V_2$ produced by the multivibrator, the gate output voltage $V_3$, and the recorded signal. Voltage $V_1$ is a constant analog signal representing the measured wall thickness. The multivibrator voltage $V_2$ alternates between upper and lower voltage levels which respectively open and close the gate. Thus, the output voltage $V_3$ of the gate is a pulsed waveform at the multivibrator frequency and having an amplitude equal or proportional to the amplitude of the wall thickness signal $V_1$. The pulses are recorded against a non-varying D.C. voltage base or reference line, and the movement of the stylus or light beam "paints" a more or less solid representation of the wall thickness signal, depending upon the frequency of the pulses, the speed of the recording paper, and the width of the stylus line. The reference D.C. voltage may be connected directly to the recording galvanometer so that the log or recording is the sum of the reference voltage and the pulsed wall thickness signal. Alternatively, the reference voltage and the wall thickness signal can be applied to the recorder through a dual gate which is controlled to alternately pass during successive half cycles of its operation the wall thickness signal and the reference voltage, respectively. By using a dual gate, the recorder will alternately record the reference signal and the analog wall thickness signal. This technique allows an observer to see the wall thickness line cross the reference line since the two signals are not additively recorded. Further, it is easier to vary the reference level while recording thereby providing greater flexibility in calibration and measurement.

The pulsed cross-sectional area signal may be recorded in the same manner as described for the wall thickness signal.

The chopping or sampling frequencies of gates 27 and 28 must be several times higher than the highest component frequency in the analog signal from the amplifiers, thus presenting high frequency pulses to the recorder. Since ink pen recorders are limited in upper frequency response, optical recorders may be preferable in some applications. Characteristically, an optical recorder is capable of fifty times the frequency response of ink pen recorders.

The wall thickness and cross-sectional area records produced in accordance with the apparatus and methods of this invention are easily read, and the possibility of failing to detect errors is minimized. While the invention has been described with reference to specific embodiments, the description is illustrative and is not to be construed as limiting the scope of the invention. Various modifications may occur to those skilled in the art without departing from the spirit and scope of the invention.

What is claimed is:
1. In non-destructive testing of tubular products, apparatus for establishing analog signals of wall thickness and cross-sectional area of a tubular product comprising:
 (a) means for scaaning said tubular product and establishing an analog electrical signal whose amplitude represents wall thickness,
 (b) a high-speed integrating means,
 (c) a slow-speed integrating means,
 (d) means connecting said analog electrical signal to said high-speed integrating means,
 (e) means connecting the output of said high-speed integrating means to said slow-speed integrating means, means for repetitively sampling the output signal of the high-speed integrating means,
 means for repetitively sampling the output signal of the slow-speed integrating menas, and
 recording means for providing respective records of the repetitively sampled output signals of the high-speed integrating means.

2. Apparatus in accordance with claim 1 wherein said high-speed integrating means is an integrating operational amplifier having a time constant between $10^{-2}$ and $10^{-5}$ second, and said slow-speed integrating means is an integrating operational amplifier having a time constant of about one second.

3. The combination claimed in claim 1 wherein,
 said recording means records the magnitude of each sample of the respective output signals, and the record of each recorded signal returns to a known reference indication between each sample.

4. The combination claimed in claim 3 wherein,
 the rate of sampling each of said output signals is several times higher than the highest component frequency in the analog signal from the respective integrating means, whereby the recording means "paints" more or less solid representations of the two output signals.

5. In non-destructive testing of tubular products, apparatus for measuring and recording wall thickness and cross-sectional area of a tubular product comprising:
 (a) means for scanning said tubular product and establishing an analog signal representing an instantaneous value of wall thickness,
 (b) a high-speed integrator,
 (c) a slow-speed integrator,
 (d) means connecting said analog signal to the input of said high-speed integrator,
 (e) means connecting the output of said high-speed integrator to the input of said slow-speed integrator,
 (f) a first gate,
 (g) means connecting the output of said high-speed integrator to said first gate,
 (h) a second gate,
 (i) means connecting the output of said slow speed integrator to said second gate, and
 (j) a recorder for recording the outputs of said first gate and said second gates.

6. Apparatus in accordance with claim 5 which includes,
 means controlling the opening and closing of said two gates to cause the individual gates to open at a rate several times higher than the highest component frequency in the respective integrator signal connected thereto.

7. Apparatus in accordance with claim 6 wherein,
 said recording means records the respective output of said two gates when the gates are open and records respective reference indications when the gates are closed.

References Cited
UNITED STATES PATENTS

| | | | |
|---|---|---|---|
| 1,713,226 | 5/1929 | Hall | 346—109 |
| 2,998,291 | 8/1961 | Coggeshall et al. | 346—13 |
| 3,023,312 | 2/1962 | Wood | 250—52 |
| 3,099,746 | 7/1963 | Walters | 250—83.3 |

RICHARD B. WILKINSON, Primary Examiner
JOSEPH W. HARTARY, Assistant Examiner

U.S. Cl. X.R.
250—83; 346—13